(12) United States Patent
Ishizuka et al.

(10) Patent No.: US 9,132,670 B2
(45) Date of Patent: Sep. 15, 2015

(54) CONVEYING DEVICE AND PRINTING APPARATUS

(71) Applicant: CANON KABUSHIKI KAISHA, Tokyo (JP)

(72) Inventors: Haruo Ishizuka, Ichikawa (JP); Masahiro Kawanishi, Yokohama (JP); Takashi Awai, Chiba (JP); Tadashi Hanabusa, Yokohama (JP); Akihiro Tomoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/715,245

(22) Filed: Dec. 14, 2012

(65) Prior Publication Data

US 2013/0194341 A1 Aug. 1, 2013

(30) Foreign Application Priority Data

Jan. 31, 2012 (JP) ................. 2012-017642

(51) Int. Cl.
| | |
|---|---|
| *H02P 1/06* | (2006.01) |
| *B41J 11/00* | (2006.01) |
| *B65G 43/00* | (2006.01) |
| *B41J 29/38* | (2006.01) |
| *B41J 29/13* | (2006.01) |
| *B41J 2/045* | (2006.01) |

(52) U.S. Cl.
CPC .............. *B41J 11/0095* (2013.01); *B41J 29/13* (2013.01); *B41J 29/38* (2013.01); *B65G 43/00* (2013.01); *B41J 2/0454* (2013.01)

(58) Field of Classification Search
CPC ............................ B41J 2/0454; B41J 11/0095
USPC ........................................................ 388/934
See application file for complete search history.

(56) References Cited

U.S. PATENT DOCUMENTS

| 5,430,468 | A | | 7/1995 | Sasai et al. |
|---|---|---|---|---|
| 5,893,051 | A | * | 4/1999 | Tomohiro ..................... 702/130 |
| 7,352,979 | B2 | * | 4/2008 | Funabiki et al. ................ 399/68 |
| 7,651,191 | B2 | * | 1/2010 | Suzuki ............................ 347/19 |
| 2004/0133408 | A1 | * | 7/2004 | Verdyck ............................ 703/2 |
| 2005/0212887 | A1 | * | 9/2005 | Tanaka et al. ................. 347/116 |
| 2008/0043053 | A1 | * | 2/2008 | Suzuki ............................ 347/17 |
| 2011/0101904 | A1 | * | 5/2011 | Sakamoto ..................... 318/473 |
| 2012/0008967 | A1 | * | 1/2012 | Shibuya et al. ................. 399/44 |

FOREIGN PATENT DOCUMENTS

| JP | 2001-083621 A | 3/2001 |
|---|---|---|
| JP | 2002-271566 A | 9/2002 |

* cited by examiner

*Primary Examiner* — Erick Glass

(74) *Attorney, Agent, or Firm* — Fitzpatrick, Cella, Harper & Scinto

(57) ABSTRACT

Provided are an image scanning device that can prevent a rise in the temperature and overloading or overheating of a conveying motor during continuous conveying of document sheets, and a conveying device that includes the image scanning device. According to the present invention, the temperature of a drive motor and the temperature of the periphery of the drive motor are predicted, and based on the predicted values, the conveying mode is selected.

14 Claims, 9 Drawing Sheets

|  |  |  |  | DRIVE DISTANCE FOR ONE SECOND [SLIT] (DOUBLE-PHASE, DOUBLE-EDGE) | | | | |
| --- | --- | --- | --- | --- | --- | --- | --- | --- |
|  |  |  |  | 100 OR SMALLER | 15000 | 30000 | 50000 | 100000 |
| CURRENT TEMPERATURE COEFFICIENT | 0 | ≤ | ≤ | 1 | 0.0000 | 0.0368 | 0.0435 | 0.0525 | 0.0750 |
|  | 1 | < | ≤ | 2 | -0.0002 | 0.0358 | 0.0426 | 0.0516 | 0.0741 |
|  | 2 | < | ≤ | 3 | -0.0005 | 0.0349 | 0.0416 | 0.0506 | 0.0731 |
|  | 3 | < | ≤ | 4 | -0.0008 | 0.0339 | 0.0407 | 0.0497 | 0.0722 |
|  | 4 | < | ≤ | 5 | -0.0011 | 0.0330 | 0.0397 | 0.0487 | 0.0712 |
|  | 5 | < | ≤ | 6 | -0.0014 | 0.0320 | 0.0388 | 0.0478 | 0.0703 |
|  | 6 | < | ≤ | 7 | -0.0018 | 0.0311 | 0.0378 | 0.0468 | 0.0693 |
|  | 7 | < | ≤ | 8 | -0.0022 | 0.0301 | 0.0369 | 0.0459 | 0.0684 |
|  | 8 | < | ≤ | 9 | -0.0027 | 0.0292 | 0.0359 | 0.0449 | 0.0674 |
|  | 9 | < | ≤ | 10 | -0.0032 | 0.0282 | 0.0350 | 0.0440 | 0.0665 |
|  | 10 | < | ≤ | 11 | -0.0037 | 0.0273 | 0.0340 | 0.0430 | 0.0655 |
|  | 11 | < | ≤ | 12 | -0.0043 | 0.0263 | 0.0331 | 0.0421 | 0.0646 |
|  | 12 | < | ≤ | 13 | -0.0048 | 0.0254 | 0.0321 | 0.0411 | 0.0636 |
|  | 13 | < | ≤ | 14 | -0.0055 | 0.0244 | 0.0312 | 0.0402 | 0.0627 |
|  | 14 | < | ≤ | 15 | -0.0061 | 0.0235 | 0.0302 | 0.0392 | 0.0617 |
|  | 15 | < | ≤ | 16 | -0.0068 | 0.0225 | 0.0293 | 0.0383 | 0.0608 |
|  | 16 | < | ≤ | 17 | -0.0076 | 0.0216 | 0.0283 | 0.0373 | 0.0598 |
|  | 17 | < | ≤ | 18 | -0.0083 | 0.0206 | 0.0274 | 0.0364 | 0.0589 |
|  | 18 | < | ≤ | 19 | -0.0091 | 0.0197 | 0.0264 | 0.0354 | 0.0579 |
|  | 19 | < | ≤ | 20 | -0.0099 | 0.0187 | 0.0255 | 0.0345 | 0.0570 |
|  | 20 | < | ≤ | 21 | -0.0108 | 0.0178 | 0.0245 | 0.0335 | 0.0560 |
|  | 21 | < | ≤ | 22 | -0.0117 | 0.0168 | 0.0236 | 0.0326 | 0.0551 |
|  | 22 | < | ≤ | 23 | -0.0126 | 0.0159 | 0.0226 | 0.0316 | 0.0541 |
|  | 23 | < | ≤ | 24 | -0.0136 | 0.0149 | 0.0217 | 0.0307 | 0.0532 |
|  | 24 | < | ≤ | 25 | -0.0146 | 0.0140 | 0.0207 | 0.0297 | 0.0522 |
|  | 25 | < | ≤ | 26 | -0.0156 | 0.0130 | 0.0198 | 0.0288 | 0.0513 |
|  | 26 | < | ≤ | 27 | -0.0167 | 0.0121 | 0.0188 | 0.0278 | 0.0503 |
|  | 27 | < | ≤ | 28 | -0.0178 | 0.0111 | 0.0179 | 0.0269 | 0.0494 |
|  | 28 | < | ≤ | 29 | -0.0189 | 0.0102 | 0.0169 | 0.0259 | 0.0484 |
|  | 29 | < | ≤ | 30 | -0.0201 | 0.0092 | 0.0160 | 0.0250 | 0.0475 |
|  | 30 | < | ≤ | 31 | -0.0213 | 0.0083 | 0.0150 | 0.0240 | 0.0465 |
|  | 31 | < | ≤ | 32 | -0.0225 | 0.0073 | 0.0141 | 0.0231 | 0.0456 |
|  | 32 | < | ≤ | 33 | -0.0238 | 0.0064 | 0.0131 | 0.0221 | 0.0446 |
|  | 33 | < | ≤ | 34 | -0.0251 | 0.0054 | 0.0122 | 0.0212 | 0.0437 |
|  | 34 | < | ≤ | 35 | -0.0265 | 0.0045 | 0.0112 | 0.0202 | 0.0427 |
|  | 35 | < | ≤ | 36 | -0.0278 | 0.0035 | 0.0103 | 0.0193 | 0.0418 |
|  | 36 | < | ≤ | 37 | -0.0292 | 0.0026 | 0.0093 | 0.0183 | 0.0408 |
|  | 37 | < | ≤ | 38 | -0.0307 | 0.0016 | 0.0084 | 0.0174 | 0.0399 |
|  | 38 | < | ≤ | 39 | -0.0321 | 0.0006 | 0.0074 | 0.0164 | 0.0389 |
|  | 39 | < | ≤ | 40 | -0.0337 | -0.0003 | 0.0065 | 0.0155 | 0.0380 |
|  | 40 | < | ≤ | 41 | -0.0352 | -0.0013 | 0.0055 | 0.0145 | 0.0370 |
|  | 41 | < | ≤ | 42 | -0.0368 | -0.0022 | 0.0046 | 0.0136 | 0.0361 |
|  | 42 | < | ≤ | 43 | -0.0384 | -0.0032 | 0.0036 | 0.0126 | 0.0351 |
|  | 43 | < | ≤ | 44 | -0.0400 | -0.0041 | 0.0027 | 0.0117 | 0.0342 |
|  | 44 | < | ≤ | 45 | -0.0417 | -0.0051 | 0.0017 | 0.0107 | 0.0332 |
|  | 45 | < |  |  | -0.0434 | -0.0060 | 0.0000 | 0.0000 | 0.0000 |

FIG.7

CONVEYING DEVICE AND PRINTING APPARATUS

BACKGROUND OF THE INVENTION

1. Field of the Invention

The present invention relates to a conveying device that includes an auto document feeder (ADF), and a printing apparatus that employs this conveying device.

2. Description of the Related Art

A conventional image scanning device equipped with an auto document feeder (hereinafter also referred to as an ADF), disclosed in Japanese Patent Laid-Open No. 2002-271566, includes a document separating/conveying unit, a motor and a controller, and, when a document has been set up in the apparatus, determines whether a motor is overloaded, or overheated and controls the feeding of the document. As a feeding control method, the scanning speed is reduced when the number of sheets of the document that have been fed, or the feeding period, has reached a predetermined value. As another control method, scanning is halted and the document sheets are held in a waiting state, or scanning is prohibited to reduce the temperature of the motor.

An image scanning device of a flat bed type, disclosed in Japanese Patent Laid-Open No. 2001-83621, includes a DC motor as a motor and a rotary encoder as a pulse generator. The speed of a rotor is controlled using a pulse counting unit, and motor stop characteristics that are accompanied by a rise in the temperature of the motor are corrected.

However, the proposal disclosed in Japanese Patent Laid-Open No. 2002-271566 is provided for a stepping motor, and no control method is disclosed for inhibiting a rise in the temperature when a DC motor is employed as a driving source. Further, according to this technique, since the determination as to whether to control a rise in the temperature is made when document sheets have been set, in a case wherein a large number of document sheets is designated as a maximum production specification value that is assumed to be required to perform such a determination, when the scanning of only a small number of document sheets is actually required, the inhibition of a temperature rise must be begun with a determination reference at which no problems will be encountered, even when the maximum number of document sheets have been set. Therefore, availability for the apparatus may be inhibited.

Furthermore, the technique disclosed in Japanese Patent Laid-Open No. 2001-83621 is related to a DC motor temperature rise, and describes the control provided for the speed of movement of a scanning unit, for a flat bed scanning process in which the scanning unit is reciprocated to read a document that has been set on a flat bed, but does not provide a description of how to control or to limit a rise in the temperature of an ADF.

As described above, according to the related art, for an ADF that employs a DC motor as a drive source, inhibiting a rise in the temperature of a DC Motor can not be accomplished by performing a simple, but accurate control procedure consequent with the warming property of the DC motor.

SUMMARY OF THE INVENTION

Therefore, one objective of the present invention is to provide a conveying device that can prevent a temperature rise and an overloading or an overheating of a conveying motor during the continuous conveyance of a document, and a printing apparatus that employs the conveying device.

To achieve this objective, a conveying device according to this invention includes a motor to convey a document sheet, wherein a temperature of the motor or a periphery of the motor is predicted by performing an addition or a subtraction using a parameter relevant to an operating state of the motor, and cumulative revolutions of the motor for a predetermined period of time; and wherein based on a value of the thus predicted temperature, an operating mode is switched between a normal mode and a temperature rise inhibiting mode.

According to the present invention, addition or subtraction is performed using the parameter related to the operating state of the motor and the cumulative revolutions of the motor for a predetermined period. When the parameter addition or subtraction is performed, the temperature at the motor or the periphery of the motor is predicted, and based on the value obtained by the temperature prediction, the operating mode is switched between the normal mode and the temperature rise inhibiting mode. As a result, an image scanning device that can prevent a motor temperature rise and the overloading or overheating of the motor during continuous sheet feeding of a document, and the conveying device and the printing apparatus equipped with such an image scanning device, can be provided.

Further features of the present invention will become apparent from the following description of exemplary embodiments (with reference to the attached drawings).

BRIEF DESCRIPTION OF THE DRAWINGS

FIG. 7 is a coefficient table showing temperature coefficients that are converted into the number of pulses output by a rotary encoder;

DESCRIPTION OF THE EMBODIMENTS

First Embodiment

Figure 1:
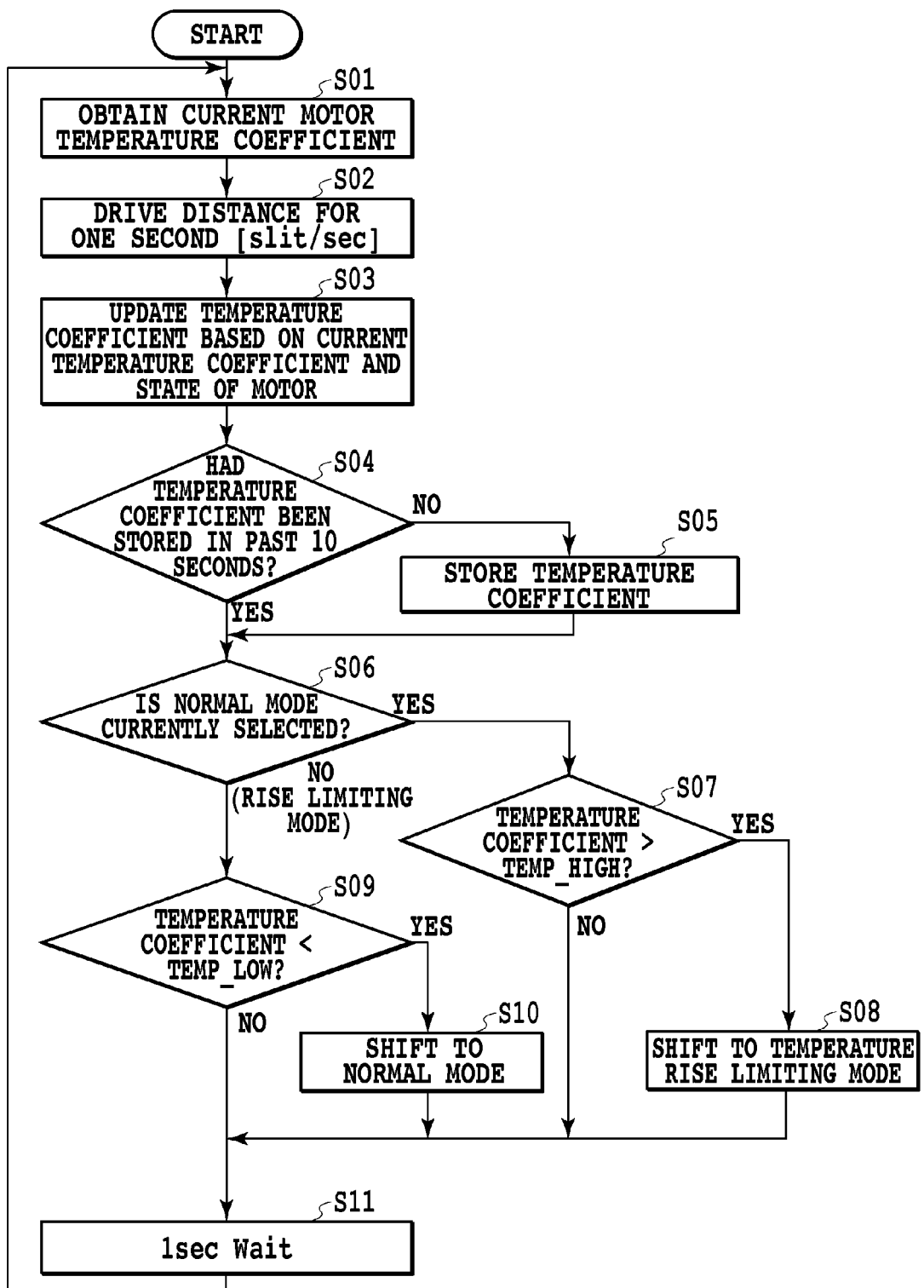
FIG. 1 is a flowchart showing a temperature control process for a drive motor.

A first embodiment of the present invention will now be described while referring to the accompanying drawings. It should be noted that an image scanning device may be provided for the main body of an image forming apparatus, such as a copier, a printer, a facsimile machine or a multifunctional machine, and be employed as one of the components of the image forming apparatus. In this case, when data are obtained by scanning a document at the image scanning device, an image is formed on a printing sheet by the image forming unit of the image forming apparatus (image forming means). That is, the image data obtained by the image scanning device is printed as a copy to a sheet by the image forming unit, or is transmitted via a communication unit to an external device.

A conveying device according to the first embodiment will now be described while referring to the drawings. In the description for this embodiment, a conveying device of the present invention that can be included in a printing apparatus is employed as an example. First, the structure and the operation of a document scanning/conveying unit 1 will be described.

Figure 2:
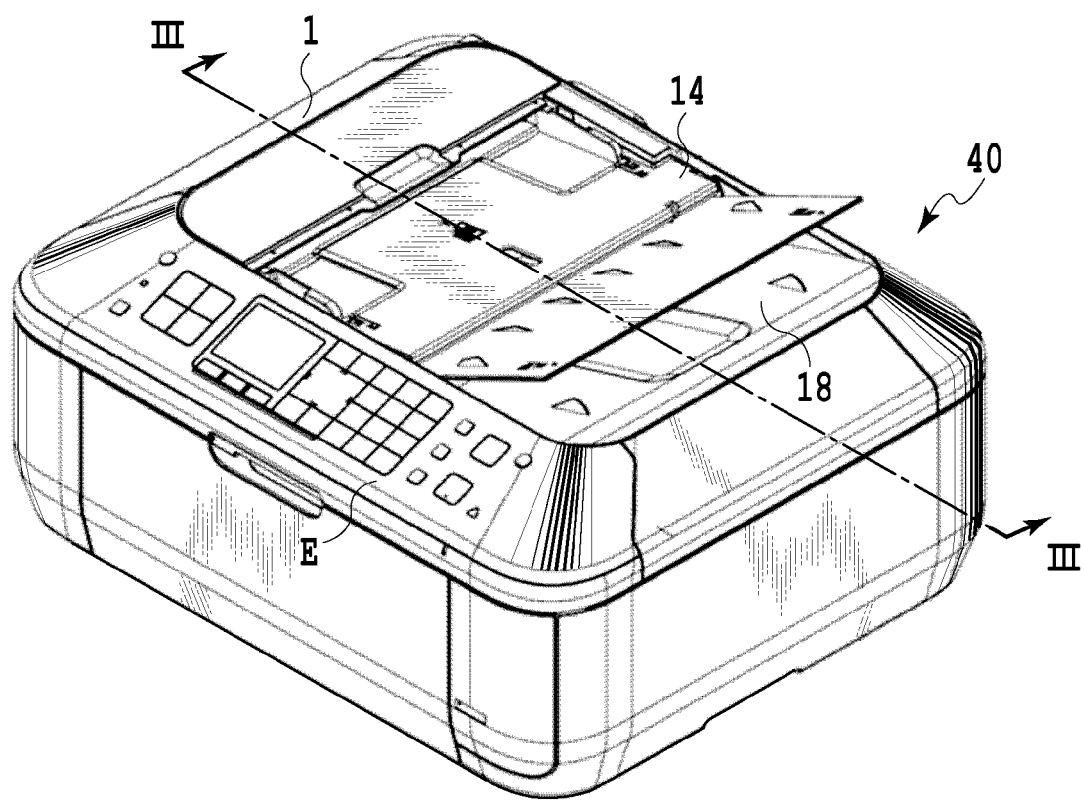
FIG. 2 is a perspective view of the external appearance of an ink jet printer for which the present invention can be applied.
Figure 3:
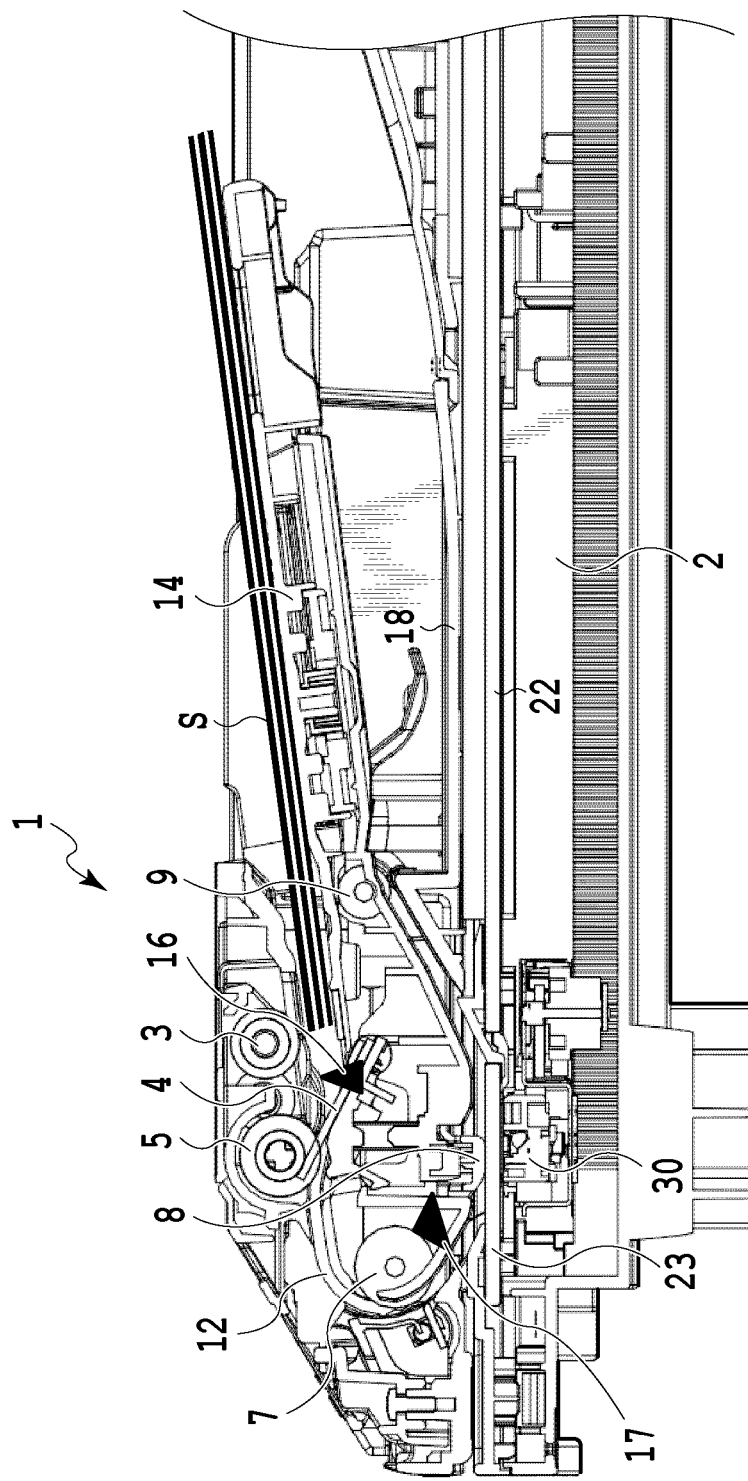
FIG. 3 is a cross sectional view of the scanning unit of the ink jet printer in FIG. 2.
Figure 4:
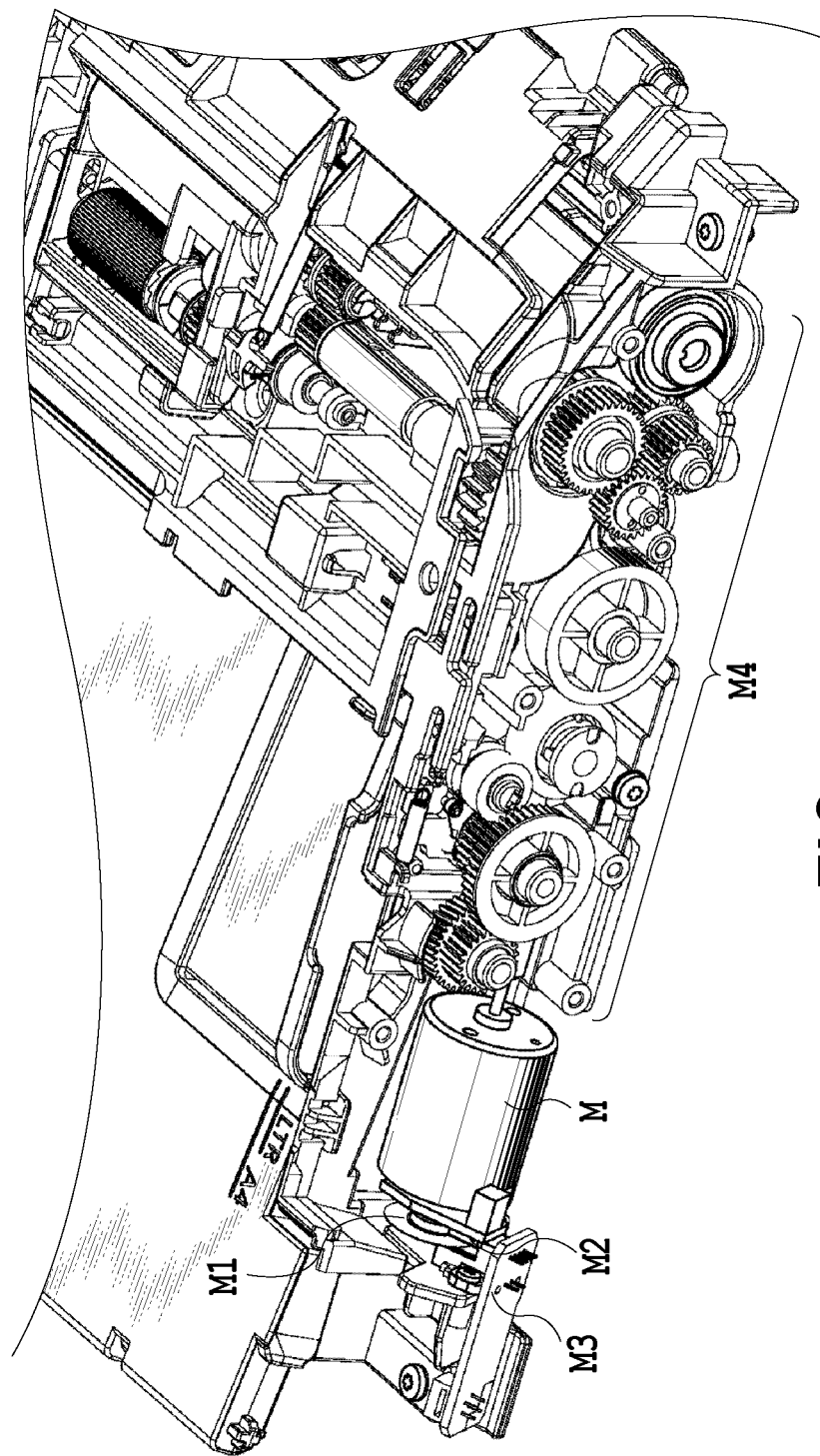
FIG. 4 is a detailed diagram showing the driver of the ink jet printer in FIG. 2.

FIG. 2 is a perspective view of the external appearance of an ink jet printer (ink jet type printing apparatus) for which the present invention can be applied. FIG. 3 is a cross sectional view of the scanning unit of the ink jet printer in FIG. 2, and FIG. 4 is a detailed diagram showing the driver of the ink jet printer in FIG. 2. The document scanning/conveying unit 1 includes a document conveyance path (U turn path 12) in an automatic feed pressure plate case 40. A document sensor 16, for detecting the presence/absence of a document sheet S, and a document edge sensor (DES) 17, for detecting the leading edge and the trailing edge of a document sheet S, are arranged along the U turn path 12.

A document mounting tray 14 is provided for the document scanning/conveying unit 1 to communicate with the upstream end of the U turn path 12 in the document conveyance direction, and a document discharge tray 18 is provided on the downstream end of the U turn path 12. Further, pickup rollers 3 are provided on the upstream end of the U turn path 12 to contact and pick up the topmost sheet S of the document sheets that are mounted.

A separating roller 5 and a separating pad are provided on the downstream of the pickup rollers 3, and in a case wherein a plurality of sheets S are picked up by the pickup rollers 3, the separating roller 5 and the separating pad 4 are pressed against each other to separate the sheets S. A first conveying roller 7 is located in the middle of the U turn path 12, while a second conveying roller 9 is arranged on the downstream end to discharge the sheet S to the document discharge tray 18.

A book page scanning unit 2 scans a book document that is placed face-down on scanner glass 22. A contact image sensor (hereinafter referred to as a CIS) 30 is located, facing the document scanning/conveying unit 1, with the scanner glass 22 in between. The CIS 30 employs an LED mounted thereon to emit light to the image data face of the sheet S, and employs a self-converging rod lens array to collect light reflected at the image data face to a sensor element and form an image thereon. In this manner, the image data is obtained.

The CIS 30 in FIG. 3 is movable to the left or to the right, and during the book page scanning process (flat bed scanning process), the CIS 30 scans a document placed on the scanner glass 22, while moving from the left to the right. When the document scanning/conveying unit 1 is employed for scanning, the CIS 30 stays at the document scanning position shown in FIG. 3 (position opposite a white scan panel 8), and scans through an ADF glass 23 the surface of the document sheet S that is conveyed to the document scanning position.

A driving system will now be described. A drive motor M is a DC motor, and a rotary encoder M3 is located nearby. An encoder sensor M2 reads a detection slit pattern printed on a code wheel film M1, which is arranged on a motor shaft, and based on the detection slit pattern, the rotary encoder M3 detects the revolutions of the drive motor M. Further, pulse with modulation (PWM) is performed based on a pulse signal transmitted from the rotary encoder M3 to control the rotation of the drive motor M.

The resolution of the rotary encoder M3 obtained by calculation based on the document scanning position (hereinafter also referred to as a printing resolution) is set as $1/36000$ inches for one slit. The drive force of the drive motor M is transmitted by a gear string M4 from the separating roller 5, via the pickup rollers 3 to the first conveying roller 7 and the second conveying roller 9.

When an operator manipulates an operating unit E to enter a scanning start instruction, the drive motor M starts rotation. In accordance with the rotation of the drive motor M, the separating roller 5 and the pickup rollers 3 are rotated, and a pickup arm is lowered to press the pickup rollers 3 against the document sheet S. Further, as the pickup rollers 3 are rotated, the document sheet S is fed inside along the U turn path 12.

At this time, in the document scanning/conveying unit 1, the document sheets S are separated by the separating roller 5 and the separating pad 4, and only the topmost document sheet S is conveyed. This sheet S is conveyed along the U turn path 12 by the first conveying roller 7, and reaches the scanning unit that includes the CIS 30. The separating roller 5 is rotated at a lower peripheral speed than that for the first conveying roller 7 and the second conveying roller 9, and since the drive motor M is continuously rotated, a predetermined distance is provided between the first sheet S and the second sheet S.

When the document edge sensor (DES) 17 detects the leading edge of the document sheet S, the document sheet S is conveyed at a predetermined distance by the document scanning/conveying unit 1, and thereafter, the CIS 30 begins scanning of the surface of the document sheet S, while conveying of the document sheet S is being continued. When the document edge sensor 17 detects the trailing edge of the document sheet S, the document sheet S is conveyed at a predetermined distance, and thereafter, the CIS 30 terminates scanning for acquisition of image data. When there is a following document sheet S, the rotation of the drive motor M is continued, and the next document sheet S is scanned to obtain image data. The conveying and image scanning of the document sheet S is repeated until the document sensor 16 detects no more document sheet S is present.

Figure 5:
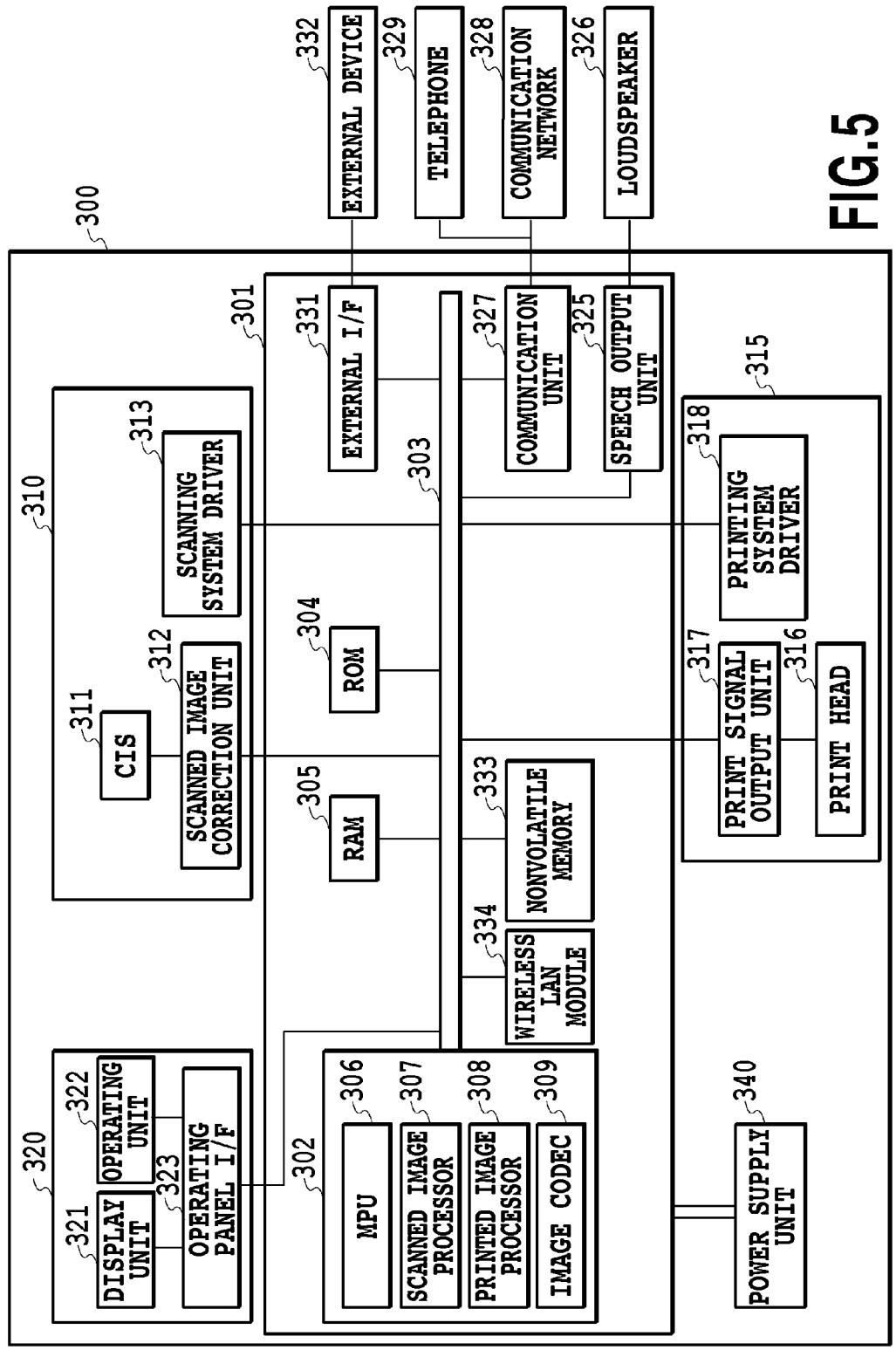
FIG. 5 is a block diagram illustrating the ink jet printer.

FIG. 5 is a block diagram illustrating the ink jet printer. In this case, a control arrangement for the ink jet printer will be described. A main control board 301 includes a main controller IC 302, a RAM 305, a ROM 304, a nonvolatile memory 333 and a wireless LAN module 334. The main controller IC 302 includes a microprocessor unit (MPU) 306, a scanned image processor 307, a printed image processor 308 and an image codec 309, and controls the entire apparatus via a system bus 303.

Program code employed for the operation of the MPU 306, data for initial values and table data are stored in the ROM 304. The RAM 305 is employed as a calculation buffer and an image memory. A scanning unit 310 includes a CIS 311, a scanned image correction unit 312 and a scanning system driver 313. The scanning unit 310 drives the scanning driver 313 to move the CIS 311, which then optically reads images in order and converts the images into electric image signals.

The scanned image correction unit 312 employs the electric image signal to perform shading correction, for example. The scanned image processor 307 performs the image processing to output high-resolution image data. When a printing unit 315 of ink jet printing type performs printing, a printing system driver 318 is driven and moves a print head 316 to a predetermined position, and a print signal output unit 317 outputs to the print head 316 image data that have been prepared by the printed image processor 308. An operating panel 320 outputs a display image to a display unit 321 via an operating panel interface 323, and receives an operating entry from the operating unit 322.

A speech output unit 325 converts speech data into a signal, and outputs a voice message through a loudspeaker 326. A communication unit 327 is connected to a communication network 328 and a telephone set 329 to input or output a speech or encoded data. The image codec 309 performs conversion of the encoded data into images, or vice versa. An interface unit 331 is an external I/F that conforms to, for example, the USB standards, and is connected to an external device 332, such as a personal computer.

The nonvolatile memory 333 is, for example, a flash memory in which work data or image data are stored so as not to be lost at the occurrence of a power failure. The wireless LAN module 334 performs input/output of images via an access point outside the apparatus. A power supply unit 340 supplies electric power required for the operations of, for example, the main control board 301, the scanning unit 310, the printing unit 315 and the operating panel 320.

The PC scanning operation, the copying operation, the facsimile transmission/reception operations and the printing operation performed in this embodiment will now be described.

(PC Scanning Operation)

When a document sheet S is scanned by the CIS 311 of the scanning unit 310, first, the scanned image correction unit 312 performs the image processing, such as shading correction, for the obtained image data. Then, the scanned image processor 307 loads the image data to the RAM 305, and the image codec 309 compresses the image data into, for example, the JPEG form. The coded data is output via the external interface unit 331 to the external device 332.

(Copying Operation)

When a document sheet S is scanned by the CIS 311 of the scanning unit 310, the scanned image correction unit 312 performs the image processing, such as shading correction, for the obtained image data. Then, the scanned image processor 307 loads the image data to the RAM 305, and the image codec 309 compresses the image data into, for example, the JPEG form, and the JPEG image data are temporarily stored. Thereafter, the image data is sequentially transmitted to the printed image processor 308, and is converted into image data to be printed. The image data to be printed is output to the print head 316 via the print signal output unit 317 to print an image on a printing sheet.

(Facsimile Transmission Operation)

When a document sheet S is scanned by the CIS 311 of the scanning unit 310, the scanned image correction unit 312 performs the image processing, such as shading correction, for the obtained image data. Then, the scanned image processor 307 loads the image data to the RAM 305, and the image codec 309 compresses the image data into, for example, the MR (Modified Read) form, and the MR image data is temporarily stored. Thereafter, the communication unit 327 performs signal transmission and reception required for facsimile communication, and begins transmission of the image data that is stored. Since scanning can be continued even after the transmission was started, storing of image data is performed, while facsimile transmission is continued.

(Facsimile Reception Operation)

When a call is received via the communication network 328, the communication unit 327 performs signal transmission and reception required for facsimile communication, and thereafter, begins reception of image data. The image codec 309 decodes the image data, and loads the decoded image data to the RAM 305. The stored image data is transmitted sequentially to the printed image processor 308, and is converted into image data to be printed. The image data to be printed is output to the print head 316 via the print signal output unit 317 to print an image on a printing sheet.

(Printing Operation)

When a command and a reception parameter are issued by the external device 332 and received by the external interface 331, the MPU 306 interprets the command and the parameter, and the image codec 309 loads the command and the parameter as image data in the RAM 305. The image data is thereafter transmitted sequentially to the printed image processor 308, and is converted into image data to be printed. The image data to be printed is output to the print head 316 via the print signal output unit 317 to print an image on a printing sheet.

FIG. 1 is a flowchart showing the control by the ink jet printer for the temperature of the drive motor M. The processing for inhibiting a rise in the temperature of the drive motor M will now be described by employing the flowchart. The motor temperature coefficient is a virtual coefficient for predicting the temperature of the drive motor M, and a numerical value that corresponds to a temperature rise ($°$ C.) when a value of the temperature of a motor case is regarded as 0 under the condition wherein the motor has been halted for a long time and the motor temperature is equal to the room temperature. First, a method for updating the temperature coefficient of the motor in the operating state will be described.

When temperature control for the drive motor M is started, at step S01, the current temperature coefficient is stored at a predetermined location of the RAM 305. At step S02, the encoder sensor M2 detects the revolutions to calculate a total moving distance (total revolutions) for one second (for a predetermined period of time). Then, at step S03, updating of the temperature coefficient is performed by adding a differential parameter, obtained by calculating the expression below based on the operating state of the drive motor M (either the state wherein the drive motor M is operated or stopped), to the latest temperature coefficient obtained at step S01.

Subsequently, at step S04, a check is performed to determine whether the temperature coefficient was stored in the nonvolatile memory 333 within the past ten seconds. When it is determined at step S04 that the temperature coefficient was stored in the past, program control moves to step S06. When it is determined at step S04 that the temperature coefficient was not stored in the past, program control moves to step S05, and the temperature coefficient is stored in the nonvolatile memory 333. Through this process, the number of times for writing to the nonvolatile memory 333 can be reduced, and missing of the temperature coefficient can be prevented at the sudden occurrence of a power failure.

At step S06, a check is performed to determine whether the current operating mode is a normal mode or a temperature rise inhibiting mode. When it is determined at step S06 that a temperature rise inhibiting mode is selected as a current operating mode, program control advances to step S09, and a check is performed to determine whether the temperature coefficient is below a threshold value LOW. When the temperature coefficient is lower than the threshold value LOW at step S09, program control moves to step S10, and the operating mode is changed to the normal mode. When it is determined at step S06 that the normal mode is selected as the current operating mode, program control moves to step S07, and a check is performed to determine whether the temperature coefficient is higher than a threshold value HIGH. It should be noted that the threshold value HIGH>the threshold value LOW.

When the temperature coefficient is higher than the threshold value HIGH at step S07, program control advances to step S08, and the operating mode is changed to the temperature rise inhibiting mode. When the temperature coefficient is not higher than the threshold value HIGH at step S07, program control moves to step S11. Further, when the mode determination process is completed at step S10 or S08, program control also moves to step S11, and waits for one second. The processing in the flowchart in FIG. 1 is repeated so long as supply of power is continued.

When this processing is performed in this manner, the temperature coefficient can be updated for each second (predetermined time interval), the scanning mode can be changed even during scanning, and a rise in the temperature can be controlled, without taking into account the maximum number of the document sheets S to be fed.

In this embodiment, the threshold value LOW is 25, and the threshold value HIGH is 35. Since the highest room temperature for this embodiment is 35° C., the threshold value LOW corresponds to 60° C. and the threshold value HIGH corresponds to 70° C. Since a difference of about 10 is provided between the threshold value LOW, for shifting to the normal mode, and the threshold value HIGH, for shifting to the temperature rise inhibiting mode, and a large value is employed for the threshold value HIGH, switching between the normal mode and the temperature rise inhibiting mode in a short period of time can be prevented, so that the operation will be performed smoothly.

Further, in this embodiment, the maximum conveyance speed in the temperature rise inhibiting mode is almost the same as that in the normal mode. Furthermore, shifting between the temperature rise inhibiting mode and the normal mode is performed while conveying of a set of document is being performed.

Figure 6:
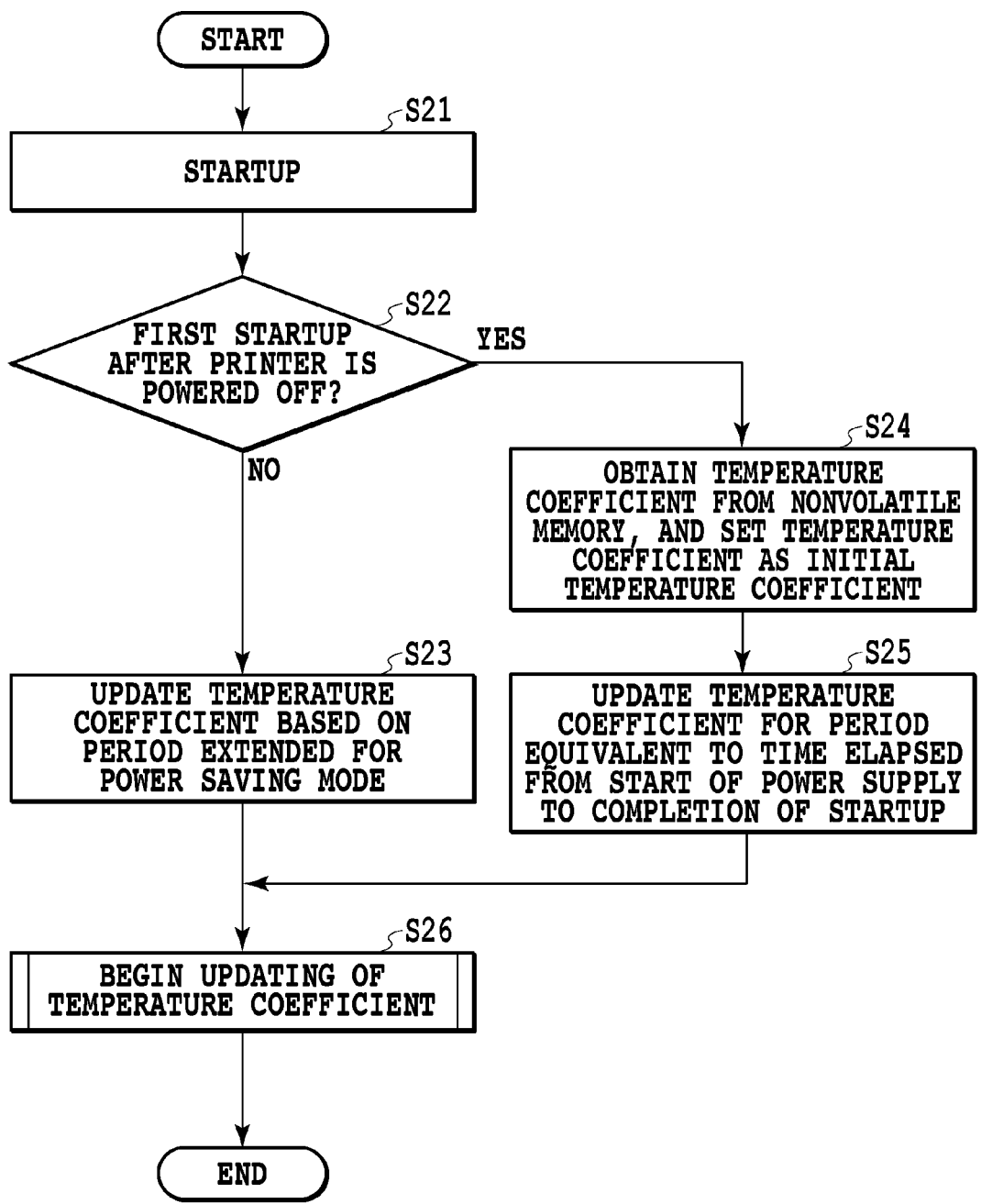
FIG. 6 is a flowchart showing the process for initializing a temperature coefficient.

FIG. 6 is a flowchart showing the processing performed for initializing a temperature coefficient that is employed to temperature control for the drive motor M of the ink jet printer. This processing is performed prior to the processing in the flowchart in FIG. 1 to initialize the temperature coefficient. The control process performed at the startup time will now be described by using the flowchart. When power of the ink jet printer is turned on and the processing is begun, at step S21, a well known startup process sequence is performed, and a self-diagnostic test is conducted for determining a hardware abnormality.

At step S22, a check is performed to determine whether this startup was performed for the first time after power of the ink jet printer was turned off. When it is determined at step S22 that the startup was performed not for the first time, it is assumed that power has been continuously supplied to the ink jet printer, and the printer has been in the power saving mode. Therefore, program control advances to step S23, and based on the elapsed time indicated by an internal timer (not shown), the temperature coefficient stored in the RAM 305 is updated, and thereafter, program control moves to step S26 to shift the state to start the normal temperature coefficient updating process. When it is determined at step S22 that the startup was performed for the first time, program control moves to step S24, and since the temperature coefficient in the RAM 305 is missing, the initial value of the temperature coefficient is obtained from the nonvolatile memory 333.

Following this, at step S25, the period elapsed from the start of power supply until the actual startup is obtained from the internal timer, and the temperature coefficient is updated based on the temperature change of the drive motor M within the elapsed period, and at step S26, the state is shifted to start the normal temperature coefficient updating process. Thereafter, the initialization process is terminated. In this manner, the initialization of the temperature coefficient is terminated, and the temperature control for the drive motor M in FIG. 1 is begun. At the time of shipping from the factory, the initial temperature coefficient value (for example, a temperature rise of 0) is stored in the nonvolatile memory 333, in advance.

Figure 8:
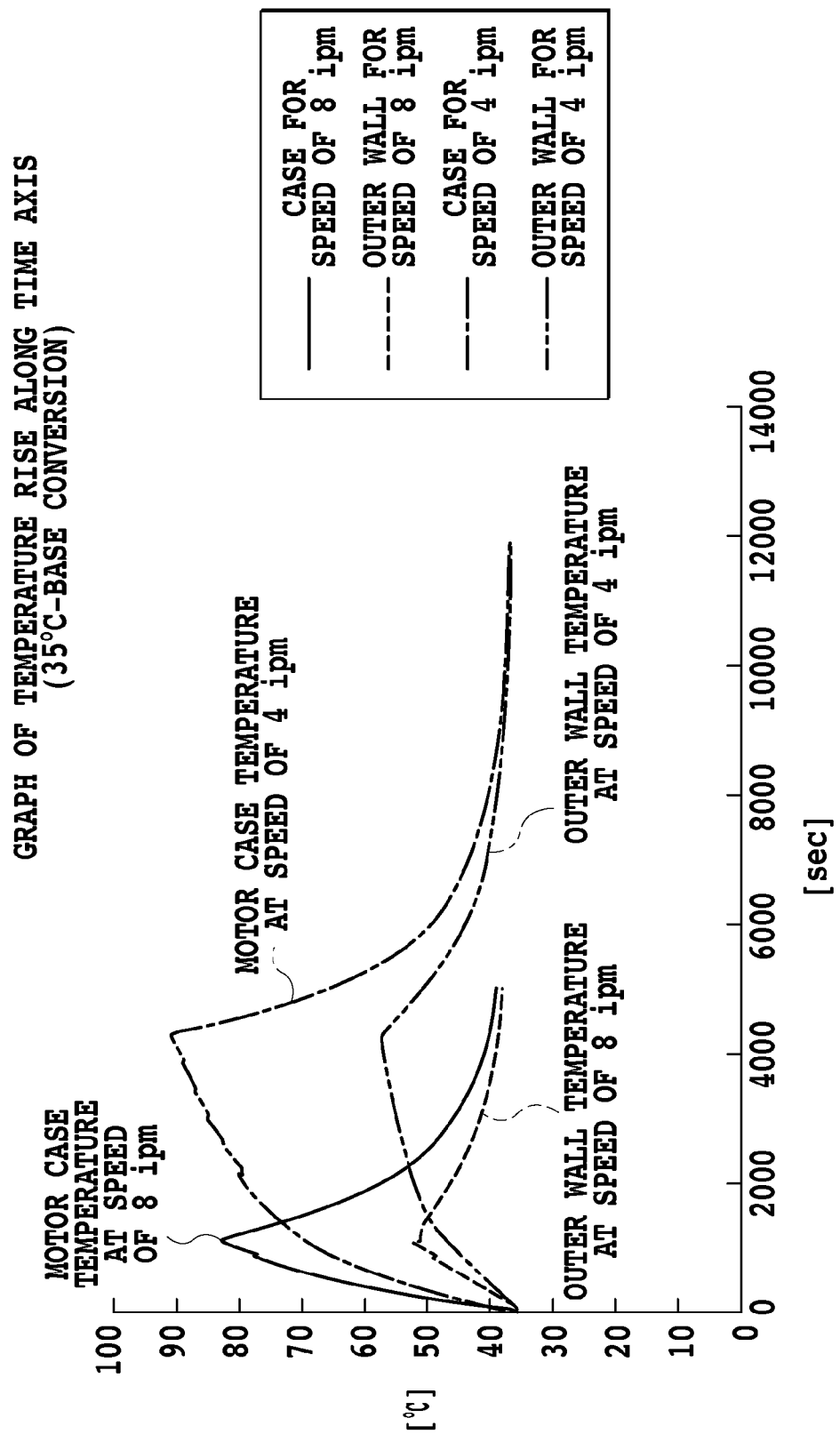
FIG. 8 is a graph showing the values of temperature rises relative to an operating period of time.
Figure 9:
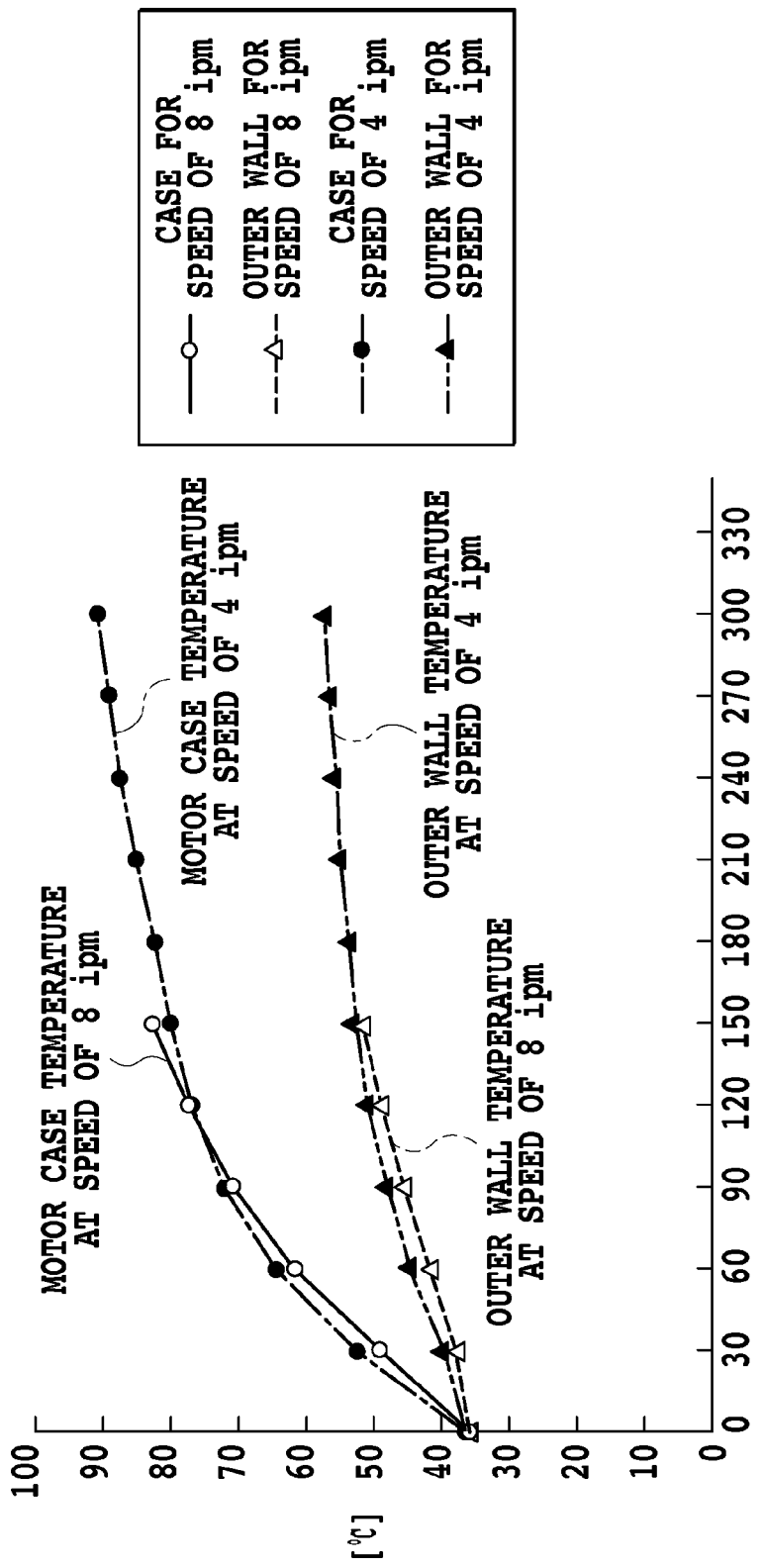
FIG. 9 is a graph showing a relationship between the number of sheets of an A4 document and the value of a temperature rise.

FIGS. 8 and 9 are graphs showing experimental data produced when the document was actually conveyed by using a DC motor of φ25 mm employed for this embodiment. The temperature coefficient will now be described in detail by employing the experimental data. The experiment was conducted with the sheet conveying speeds of 8 ipm (8 sheets per minute) and 4 ipm (4 sheets per minute). The case of the drive motor M and the outer wall of the cover in the vicinity of the drive motor M were employed as measurement points, and the graph lines show temperature rise values from 35° C., which is the maximum operating temperature of the apparatus.

The graph in FIG. 8 shows a temperature rise value in the periphery of the drive motor M with respect to the operating period. For both the motor case and the outer wall, the degree of the temperature rise differs depending on the sheet conveying speed. Therefore, it is found that in order to predict a temperature rise based on the operating period of the drive motor (to perform temperature prediction), condition analysis for the prediction is required while also taking the conveying speed into account, and that temperature prediction for multiple operating speeds is difficult. The down curvature in the graph shows a reduction of a temperature after the drive motor M was halted, and the decrease from a predetermined temperature does not depend on the conveying speed. Therefore, after the drive motor M is stopped, a prediction expression for a temperature drop value in FIG. 8 can be provided by employing the dependence of the stop period.

The graph in FIG. 9 shows a relationship between the number of document sheets of A4 size that were conveyed and a temperature rise value. It is found that, so long as the same number of sheets were conveyed in a period from the start of the operation until the temperature rise, i.e., the number of revolutions of the motor was the same, almost the same temperature rise value was obtained for all the examples. A difference in temperatures due to various speeds is about 3° C. at the maximum, and when this temperature difference is included as a margin, the prediction expression for a temperature rise value can be provided by employing the rotation rate of the motor per unit time. In this case, the expression that represents the temperature coefficient during the operation of the drive motor M should be Temperature coefficient=Temperature constant*Current temperature coefficient+Speed constant+Intercept, wherein
Temperature constant: −0.00095
Speed constant: 4.5×1.00E-07
Intercept: 0.03.

Furthermore, a calculation expression that represents the temperature coefficient when the drive motor M is stopped should be Temperature coefficient=$A$*Current temperature coefficient^2+$B$*Current temperature coefficient, wherein
A: −0.000017
B: −0.0002

The coefficient table in FIG. 7 shows the temperature coefficients that are obtained by the above expressions, and are converted into the number of pulses output by the rotary encoder M3. A parameter related to a distance (converted into the output pulse count of the rotary engine) at which the drive motor M is rotated is added to, or subtracted from, the current temperature coefficient. Further, for increasing the calculation speed, the temperature coefficient table is divided into rows of predetermined ranges in accordance with individual rotating distances for one second.

The temperature coefficient is provided as a predicted value of a temperature rise from the room temperature (for example, 35° C.) in an environment where it is assumed that the apparatus is employed, and the state wherein the drive motor M is halted for a longtime is set to 0. As previously explained while referring to FIG. 1, the temperature coefficient is updated for each second. When the approximate value of the coefficient is calculated by the conversion expression and entered into a table in this manner, floating-point multiplication like the above described expression is not required when the drive motor M is actually rotated, and a calculation load imposed on the MPU 306 can be reduced.

The number of rows in the coefficient table may be increased or reduced in accordance with desired calculation accuracy, and in a case wherein a calculation load does not matter, the calculation may be performed using the expression each time the coefficient is updated. It should be noted that a predetermined period of one second, employed for this embodiment, is longer than a predetermined period required for increasing or reducing the speed of the drive motor M.

The normal mode and the temperature rise inhibiting mode, described while referring to FIG. 1, will now be described in detail. In the normal mode, the speed for scanning the document sheet S should be equal to a conveying speed V that is determined based on the operating inhibit speed of the CIS 311, the processing speed of the main controller IC 302, the number of colors to be scanned and the resolution. At this time, feedback control is performed by employing a pulse signal output by the rotary encoder M3, and the drive motor M is controlled to convey the document at the conveying speed V.

In the normal mode, the document sheets S are sequentially scanned so long as a predetermined size of image buffer memory is obtained in the RAM 305. When during scanning the capacity of the image buffer becomes smaller than the data size for one document sheet S, the image scanning for the succeeding document sheet S is temporarily stopped, and the processing for image data is continued to wait until appropriate space for the image buffer is obtained.

The temperature rise inhibiting mode will now be described. The temperature rise inhibiting mode is a mode in which image scanning is continuously performed, while inhibiting of a temperature rise of the drive motor M is maintained, so that the image scanning will not be completely stopped. As described above, when the drive motor M employed for this embodiment is continuously rotated, the temperature rise depends on the amount of rotation. Therefore, when the scanning speed is merely reduced, the scanning period of time would be extended, and the temperature rise can not be inhibited.

Further, in a case wherein scanning for the document is halted to reduce the temperature, a period since the temperature is dropped until the scanning is resumed would be extended. In this case, accordingly, the interval for transmission of image data may be extended, and there is a probability that, in facsimile transmission, an apparatus on the reception side may determine a communication error has occurred and may disconnect communication by sending a timeout error message.

In this embodiment, therefore, the property of the temperature rise of the drive motor M described above is employed, and in the temperature rise inhibiting mode, the following processes are repeated:

data converted into 540 lines based on 300 dpi is scanned (the maximum speed V and the operating period of about 0.8 seconds that includes the accelerating and decelerating periods); and scanning is halted for one second.

When scanning and transmission of data are continued in this process cycle, the reception side apparatus can periodically receive data, and the probability for avoiding the occurrence of a timeout error can be increased. The accelerating time and the decelerating time in the scanning period are about 0.05 seconds.

Therefore, in a case wherein the rotation speed of the drive motor M is employed to perform accurate prediction of the amount of generated heat, detection of acceleration or deceleration is required. In order not to miss the acceleration or deceleration, the prediction calculation must be completed in a short period of 0.05 seconds or shorter (for example, about 0.02 seconds), and a calculation load imposed on the MPU 306 is increased very much.

According to the method of this embodiment, however, since calculation is performed only for each second, the calculation load can be reduced, and a surplus calculation performance is not required, so that a low-sped MPU at a low cost can be employed. Furthermore, when the maximum scanning speed in the temperature rise inhibiting mode is set equal to that in the normal mode, the light quantity control for the LED of the CIS 30, which is required for switching between the temperature rise inhibiting mode and the normal mode, need not be changed, and the operating mode can be switched between the two modes at an arbitrary time.

In this embodiment, a DC motor has been employed as the drive motor M; however, the drive motor M is not inhibited to a DC motor, and another type of motor may be employed.

As described above, the operating state of the drive motor M is employed to predict the temperature of the drive motor M and the temperature of the periphery of the drive motor M, and based on the predicted value, the conveying mode is selected. As a result, the conveying device that can prevent the temperature rise of the conveying motor and overloading or overheating of the conveying motor, which are accompanied by continuous conveying of the document sheets, and the printing apparatus equipped with the conveying device can be provided.

Second Embodiment

A second embodiment of the present invention will now be described while referring to the drawings. Since the basic arrangement of this embodiment is the same as that for the first embodiment, only the characteristic structure will be described.

In this embodiment, a case wherein a temperature detection element provided for a print head 316 is employed will be explained. A well known head temperature sensor is mounted on the print head 316 to stabilize ink jet printing. The head temperature sensor detects a print head temperature TP during the operation. Therefore, in a case wherein the printing operation is not being performed for a long time, the room temperature is the lowest print head temperature TP that is detected, and when the printing operation is being performed, the temperature of the print head 316 that is increased because of the operation is the highest temperature TP.

Furthermore, since the print head 316 and a drive motor M are located at a distance, the print head temperature TP and the temperature of the drive motor M do not interact with each other. In this embodiment, based on this characteristics, the following control process is performed to operate the drive motor M in the normal mode for a long period of time. At this time, the temperature obtained by subtracting the print head temperature TP from the expected highest room temperature (35° C. in this embodiment) is employed as a corrected temperature TD.

When as a result of comparison with the threshold value LOW/threshold value HIGH in FIG. 1, the value of the corrected temperature TD is greater than 0 (35° C.>the print head temperature TP), the corrected temperature TD is subtracted from the threshold value (temperature fluctuation). When the corrected temperature TD is equal to or lower than 0 (35° C.≤the print head temperature TP), i.e., when the print head temperature TP is equal to or greater than a predetermined level, the threshold value is employed unchanged (as a constant value).

According to this method, when the print head temperature TP is low, the threshold value up to the print head temperature, for example, can be dropped to 10. Further, when the print head temperature TP is high (for example, the print head temperature TP=25° C.) immediately after the printing has been performed, the corrected temperature TD is 10, or in a case wherein the temperature is so high that the mode may enter the temperature rise inhibiting mode, the same control process as in the first embodiment is performed.

Through this control process, when the room temperature is lower than the expected maximum room temperature, it can be determined that the temperature of the drive motor M is lower than the predicted temperature, and the operating period in the normal mode can be extended longer than in the first embodiment. The control process in this embodiment is effective especially for case wherein a scanning operation, such as PC scanning or facsimile transmission, that does not accompany the operation by the printing unit is repetitively performed.

While the present invention has been described with reference to exemplary embodiments, it is to be understood that the invention is not inhibited to the disclosed exemplary embodiments. The scope of the following claims is to be accorded the broadest interpretation so as to encompass all such modifications and equivalent structures and functions.

This application claims the benefit of Japanese Patent Application No. 2012-017642, filed Jan. 31, 2012, which is hereby incorporated by reference herein in its entirety.

What is claimed is:

1. A conveying device comprising:
   a conveyer unit conveying a sheet;
   a motor for driving the conveyer unit;
   an estimate device for estimating temperature of the motor based on a rotation amount and a stop period of the motor; and
   a determination device to determine whether to drive the motor either in a first mode in which the motor is continuously rotated or in a second mode in which the motor is intermittently rotated based on an estimation result of the estimate device.

2. The conveying device according to claim 1, wherein the estimate device estimates the temperature of the motor by performing an addition or a subtraction using a parameter relevant to an operating state of the motor, and cumulative revolutions of the motor for a predetermined period of time, and addition or subtraction of the parameter is performed for each interval of the predetermined period of time.

3. The conveying device according to claim 2, wherein the interval of the predetermined period to perform the addition or subtraction is longer than a period required for accelerating or decelerating the motor.

4. The conveying device according to claim 1, wherein the maximum conveying speed in the second mode is almost equal to a conveying speed in the first mode.

5. The conveying device according to claim 1, wherein switching between the first mode and the second mode is performed during conveying a set of sheets.

6. The conveying device according to claim 1, wherein a threshold value used for shifting the operating mode from the first mode to the second mode is greater than a threshold value used for shifting the operating mode from the second mode to the first mode.

7. The conveying device according to claim 1, wherein rotation of the motor is detected by a rotary encoder.

8. A reading device comprising:
   a reading unit;
   a conveyer unit conveying a sheet;
   a motor for driving the conveyer unit;
   an estimate device for estimating temperature of the motor based on a rotation amount and a stop period of the motor; and
   a determination device to determine whether to drive the motor either in a first mode in which the motor is continuously rotated or in a second mode in which the motor is intermittently rotated based on an estimation result of the estimate device.

9. The reading device according to claim 8, wherein the estimate device estimates temperature of the motor by performing an addition or a subtraction using a parameter relevant to an operating state of the motor, and cumulative revolutions of the motor for a predetermined period of time, and addition or subtraction of the parameter is performed for each interval of the predetermined period of time.

10. The reading device according to claim 9, wherein the interval of the predetermined period to perform the addition or subtraction is longer than a period required for accelerating or decelerating the motor.

11. The reading device according to claim 8, wherein the maximum conveying speed in the second mode is almost equal to a conveying speed in the first mode.

12. The reading device according to claim 8, wherein switching between the first mode and the second mode is performed during conveying a set of sheets.

13. The reading device according to claim 8, wherein a threshold value used for shifting the operating mode from the first mode to the second mode is greater than a threshold value used for shifting the operating mode from the second mode to the first mode.

14. The reading device according to claim 8, wherein rotation of the motor is detected by a rotary encoder.

* * * * *